United States Patent
Medbo et al.

(10) Patent No.: US 9,210,641 B2
(45) Date of Patent: Dec. 8, 2015

(54) METHOD AND ARRANGEMENT FOR SUPPORTING HANDOVER OF A MOBILE TERMINAL IN CERTAIN SCENARIOS

(75) Inventors: Jonas Medbo, Uppsala (SE); Konstantinos Dimou, Stockholm (SE); Jan-Erik Berg, Sollentuna (SE); Xie Jun, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 664 days.

(21) Appl. No.: 13/500,221

(22) PCT Filed: Oct. 7, 2009

(86) PCT No.: PCT/SE2009/051116
§ 371 (c)(1),
(2), (4) Date: Jul. 23, 2012

(87) PCT Pub. No.: WO2011/043705
PCT Pub. Date: Apr. 14, 2011

(65) Prior Publication Data
US 2012/0289233 A1    Nov. 15, 2012

(51) Int. Cl.
*H04W 36/32* (2009.01)
*G01S 11/10* (2006.01)

(52) U.S. Cl.
CPC .............. *H04W 36/32* (2013.01); *G01S 11/10* (2013.01)

(58) Field of Classification Search
CPC ..... H04W 36/32; H04W 36/04; H04W 36/08; H02J 17/00; H04L 67/02
See application file for complete search history.

(56) References Cited

U.S. PATENT DOCUMENTS

| | | |
|---|---|---|
| 2006/0205406 A1 | 9/2006 | Pekonen et al. |
| 2007/0111731 A1* | 5/2007 | Zaki ............................. 455/436 |
| 2010/0240368 A1* | 9/2010 | Fox et al. ................... 455/435.3 |

FOREIGN PATENT DOCUMENTS

WO    2009/058069 A1    5/2009

OTHER PUBLICATIONS

Austin, M. et al. "Velocity Adaptive Handoff Algorithms for Microcellular Systems." IEEE Transactions on Vehicular Technology, vol. 43, No. 3, Aug. 1994.
Zoican, R. "Comparative Analysis of the Handoff Strategies for Microcellular Systems." IEEE 4th International Symposium on Spread Spectrum Techniques and Applications, vol. 3, pp. 1178-1181, Sep. 22-25, 1996.
Austin, Mark D. et al., "Direction Biased Handoff Algorithms for Urban Microcells", Vehicular Technology Conference, 1994 IEEE, 44th Stockholm, Sweden, Jun. 8-10, 1994, pp. 101-105.
Narasimhan, Ravi et al., "Estimation of Mobile Speed and Average Received Power in Wireless Systems Using Best Basis Methods", IEEE Transactions on Communications, vol. 49, No. 12, Dec. 2001, pp. 2172-2183.
Ozdural, O. C. et al., "Mobile Direction Assisted Predictive Base Station Switching for Broadband Wireless Systems", Proceedings of the 2007 IEEE International Conference on Communications, Jun. 24-28, 2007, Glasgow UK, pp. 5570-5574.
Sympath, Ashwin et al., "Estimation of Maximum Doppler Frequency for Handoff Decisions", Proceedings of the Vehicular Technology Conference, IEEE 1993, Secaucus, NJ, May 18-20, 1993, pp. 859-862.

\* cited by examiner

*Primary Examiner* — Mazda Sabouri
(74) *Attorney, Agent, or Firm* — Murphy, Bilak & Homiller, PLLC

(57) ABSTRACT

Method and arrangement in a mobile terminal in a wireless communication system, for supporting a handover from a serving cell to a target cell. The method comprises determining 104a if the mobile terminal has moved in a predefined way in relation to at least one potential target cell. The determining is based on Doppler shift measurements 102a. The method further comprise adjusting 106a at least one handover related parameter, in order to enable a fast handover, when it is determined that the mobile terminal has moved in the predefined way in relation to the at least one potential target cell.

13 Claims, 13 Drawing Sheets

METHOD AND ARRANGEMENT FOR SUPPORTING HANDOVER OF A MOBILE TERMINAL IN CERTAIN SCENARIOS

TECHNICAL FIELD

The invention relates to a method and an arrangement in a telecommunication system, in particular to enable determination of if a mobile terminal has entered a certain handover related situation.

BACKGROUND

Conventionally, a handover of a mobile terminal is initiated if the mobile terminal receives a signal power from a target cell, which is a hysteresis (H) dB higher or lower than a signal power received from a serving cell for more than time-to-trigger (TTT) seconds.

In a telecom system having a high traffic load in, for example, a Manhattan-like environment, users moving with a relatively high speed, e.g. 50 km/h, will experience considerable handover failure in their mobile terminals when they are turning around street corners. However, for low speed users moving with a speed of e.g. 3 km/h, the handover performance is generally good. It has been shown that most handover failures in such a scenario are caused by unsuccessful reception of handover commands. The main reason for these failures is a delayed initiation of the handover, due to e.g. the so-called "corner effect", which causes the signal strength from the serving cell to drop as much as 20 to 30 dB within 1 to 2 seconds, and the downlink interference to increase rapidly as the target cell suddenly comes in LOS (Line Of Sight) from the mobile terminal.

In order to reduce such handover failures, a faster handover triggering can be enabled by changing to more "aggressive" mobility parameters, i.e. a shorter TTT and/or smaller H. However, the use of such aggressive parameters also creates many unwanted so-called ping-pong handovers, i.e. when mobile terminals are unnecessarily handed over to and from neighbour cells.

Therefore, such aggressive parameters should only be used in adequate situations, such as for example when a mobile terminal has turned or initiated a turn around a corner in a Manhattan-like scenario. However, no satisfactory method to decide when such an adequate situation arises is known today.

A velocity based corner detecting method is proposed in "Velocity Adaptive Handoff Algorithms for Microcellular Systems", by Mark D. Austin, Gordon L. Stüber, Vehicular Technology, IEEE Transactions on, in Volume 43, Issue 3, August 1994 Page(s):549-561

In the methods proposed by Austin and Stüber, velocity estimates are used to detect if a mobile terminal has turned a corner or not. Upon detection of the fact that the UE has turned a corner, fast handover is triggered by using a lower hysteresis (H) for L meters or seconds, after which the original hysteresis is reset. This method may, in some situations, counteract the corner effect, but, all velocity based methods will have a significant bias when plane waves arrive from the perpendicular direction with high directivity, as for example when downlink signals from a base station in a street canyon perpendicular to the direction of movement of a mobile terminal, reach the mobile terminal in an intersection in a Manhattan-like environment. In other words, it is difficult to accurately determine the velocity of an object based on directional signals arriving from a direction perpendicular to the objects direction of movement, due to that the object may appear to be in approximately the same position in relation to the emitter of the incoming signals for some time. Therefore, these methods cannot be relied on to make correct estimations in all situations.

SUMMARY

It would be desirable to obtain an improved mechanism for supporting the handover process and reducing the amount of handover failures for mobile terminals. It is an object of the invention to address at least some of the issues outlined above. Further it is an object of the invention to provide a mechanism for enabling a more reliable handover operation considering the movements of a mobile terminal.

According to one aspect, a first method is provided for supporting a handover of a mobile terminal from a serving cell to a target cell. Within the method, it is determined if a mobile terminal has moved in a predefined way in relation to a potential target cell based on Doppler shift measurements, and if the mobile terminal has moved in the predefined way, at least one handover related parameter is adjusted in the mobile terminal in order to enable a handover.

According to another aspect, a first arrangement is provided, which is adapted to support a handover of a mobile terminal from a serving cell to a target cell. The arrangement comprises different units for determining if the mobile terminal has moved in a predefined way in relation to a potential target cell based on Doppler shift measurements, and for adjusting at least one handover related parameter in order to enable a handover if the mobile terminal has moved in the predefined way.

The above method and arrangement may be used to avoid unwanted handover failures or ping-pong handovers, since e.g. a fast handover is enabled in situations where the mobile terminal risks to lose contact with its serving cell before it can be handed over to a serving cell.

According to yet another aspect, a second method is provided for determining if the Doppler based first method described above should be used within a certain cell or not. Within the second method, handover related information is generated and communicated to mobile terminals located in the cells, in which the Doppler based first method should be used.

According to yet another aspect, a second arrangement is provided, which comprises different units adapted to perform the determination, generation and communication in accordance with the second method described above.

The above second method and arrangement may be used in order to apply the Doppler based first method only in situations or cells where it will have the desired effect, i.e. situations or cells comprising a certain type of handover problems, such as e.g. corner effects.

The first method and arrangement may be implemented in different embodiments. In one embodiment, a handover related parameter is changed if the Doppler shift relative a potential target cell first is below one threshold and then rises above another threshold, all while the received signal power of the potential target cell exceeds yet another threshold. The handover related parameter could be either one or both of the Time To Trigger and the Hysteresis H, which could be set to more aggressive values in order to enable a fast handover decision, according to one embodiment. In one embodiment the adjusted parameters are restored when a handover is completed or when a predetermined time period has elapsed after the parameters were changed.

In one embodiment, the Doppler based first method is applied when a third criterion is fulfilled. The third criterion is fulfilled if the mobile terminal is in a cell comprising characteristic elements, such as e.g. an intersection in a Manhattan-like area, or two approximately co-located narrow cells pointing in opposite directions along a road, railway or waterway, where vehicles pass by.

Further, the Doppler based first method could be applied in a mobile terminal if it has a velocity which exceeds a predetermined threshold, and if the system load exceeds another predetermined threshold.

These embodiments may assure that the Doppler based first method above is used in cells where it will have the desired effect.

In one embodiment, the mobile terminal may receive information concerning the Doppler based first method, such as e.g. when to apply it, or what values of TTT or H to use, via a broadcast message or via explicit signalling. If the Doppler based first method is to be used within a whole cell, it could be convenient to communicate information concerning the Doppler based first method in a broadcast message in the cell. If it is identified that a certain mobile terminal in a certain cell should use the method, it could be convenient to communicate information concerning the Doppler based first method via explicit signalling to the mobile terminal.

Different embodiments of the second method and arrangement may be used to provide the information described above, i.e.

handover parameters to be used to induce a handover or information concerning the situation in the cell, which could be communicated in a cell via a broadcast message. In one embodiment, it is determined if a certain mobile terminal should use the Doppler based first method, and then the information could be communicated to said mobile terminal via explicit signalling.

The above embodiments have basically been described in terms of a method. However, the described arrangements have corresponding embodiments where the different units are adapted to carry out the above described method embodiments.

Further, according to yet another aspect, a computer program product is provided, which comprises instructions, which will perform the first or second method above when executed by a processor or the like. The instructions could also be said to, when executed by a processor or the like, cause the units of the different arrangements described above to perform tasks in accordance with the first and second method above.

BRIEF DESCRIPTION OF THE DRAWINGS

The invention will now be explained in more detail by means of exemplary embodiments and with reference to the accompanying drawings, in which.

DETAILED DESCRIPTION

Figure 1A:
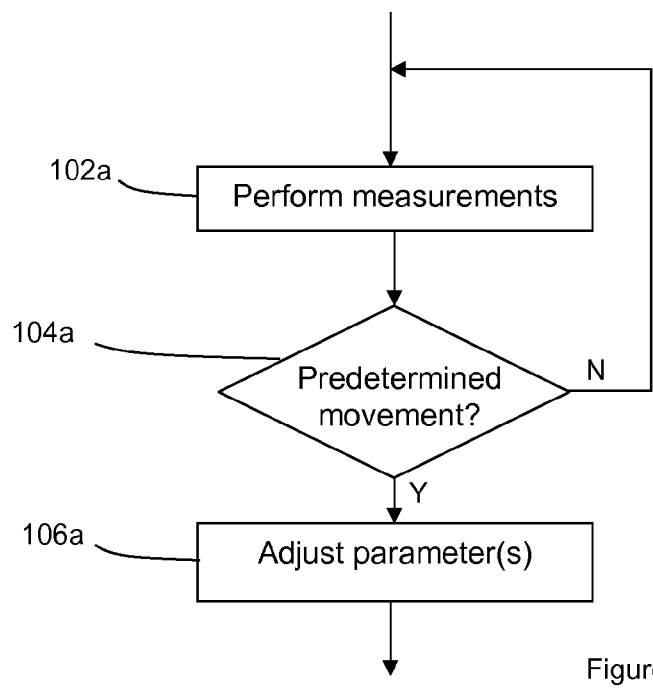
FIGS. 1a and 1b are flowcharts illustrating embodiments of method steps.

Briefly described, a solution is provided for enabling determination of if a mobile terminal has moved in relation to potential target cells in a certain predefined way or not. The solution is particularly useful in some handover-related situations, which occur in certain traffic scenarios, which will be described in more detail further below. The solution may also be used in other, similar situations, where it is desirable to determine if a moving device has changed direction or moved in a certain way.

SOME DEFINITIONS

Within this document some expressions will be used when describing parameters and situations related to handover. For example, handover related parameters will be discussed in terms of the "aggressive mobility parameters" "short" TTT and "small" H, henceforth also called TTT_Aggressive and H_Aggressive. By "aggressive" parameters is within this document meant parameters, which when used in a handover situation will enable the performance of a fast handover, and by fast handover is within this document meant a handover which is performed notably faster than a handover performed using default mobility parameters, i.e. the decision to initiate a handover is taken earlier. By default mobility parameters is meant conventional or conservative mobility parameters used in most regular handover situations.

By the terms "small" H and "short" TTT is within this document meant small and short in relation to conventionally used default values of TTT and H, respectively. In the normal regular case, a sufficiently long TTT value, and a sufficiently large H value are used as default in order to avoid ping-pong handovers. Therefore "small" and "short" should be read as meaning "notably smaller or shorter than the default values". The "short" TTT may even be set to 0 seconds.

Further, different "scenarios" will be discussed. By scenario is within this document meant a situation comprising certain characteristic elements. For example, a situation comprising an intersection surrounded by high buildings is within this document referred to as a Manhattan-like scenario, or a Scenario Type I. The buildings are characterised by that communication radio signals cannot easily propagate through them or pass over their rooftops. Communication radio signals will instead propagate along the relatively narrow street canyons between the buildings. The buildings could be e.g. sky-scrapers, thus "Manhattan".

Below, different embodiments of the Doppler based procedure will be described.

For example, the provided Doppler based procedure enables the use of aggressive handover related mobility parameters, i.e. a short TTT and/or a small H, upon the detection of e.g. that a mobile terminal has turned a street corner in a Manhattan-like scenario. As described earlier, the signal strength from a serving cell may drop as much as 20 to 30 dB within 10 to 20 meters in such a corner scenario, and the downlink interference increases rapidly when a target cell comes in LOS. The use of aggressive parameter values will induce a fast handover decision, which entails that a mobile terminal can be handed over to a target cell in time, before it involuntarily loses contact with its serving cell.

If aggressive handover parameters are applied in non-appropriate situations, the result will be unwanted handovers, which consume a lot of resources. In order to use aggressive handover parameters only in appropriate situations, e.g. in a Scenario Type I, a mobile terminal should be able to detect e.g. if it has turned or is about to turn a corner or not. This detection is performed by utilising Doppler shift information, which will be described in more detail below. Thus, in order to perform the detection, the mobile terminal should have the capability to measure Doppler shift. This capability is not standardised in most mobile communication systems today, but may be implemented in future versions of many standards. Moreover, even if Doppler shift measurements is not part of any standard, this does not prevent that some mobile terminal vendors may implement this feature and offer it as an additional feature to their clients, in case the operator's network supports this feature.

The aggressive and default mobility parameters to be used could be tuned to optimal values by the network, which then should inform the mobile terminals of the tuned values. Further, the network should be able to configure a Doppler shift difference threshold, which indicates that a mobile terminal is in a situation where it may run the risk of losing contact with its serving base station before it has been handed over to a target base station, or that indicates that a mobile terminal has left a high speed train at a station. Moreover, the mobile terminals could be informed of the number of cells on which they are to perform Doppler shift measurements. However, these issues can be solved in different ways, and this description will not go into detail on all of them.

The described procedure could also be used in other situations than corner turning in Manhattan-like areas. For example the procedure could be used in a high speed train scenario, henceforth called a Scenario Type II. The Type II scenario can be described as when, at e.g. a train station, two co-located base stations generating narrow cells, which point in each direction along the tracks, where some high speed trains stop, and some do not stop at the station. A third base station is located e.g. by the train station, which third base station covers the two co-located base stations In this situation, no corners are turned, but the respective changes in received signal power and Doppler shift in relation to the potential target cells, which are perceived by: a mobile terminal which leaves a train at the train station, a mobile terminal which stays in a train that stops at the train station, or a mobile terminal which pass the station in a train that moves at a relatively high speed, are distinguishable. In Scenario Type II, the mobility parameters of mobile terminals travelling in a high speed train are assumed to have been set to aggressive values at some point. Hence, an embodiment of the invention may be used in order to determine how the mobile terminal moves in relation to the different base stations, and if the mobility parameters should be changed to conservative settings or not. The Scenario Type II is not limited to a railway, but can also be other scenarios where two relatively co-located narrow cells point in relatively opposite directions along e.g. a road, waterway or rail, where vehicles pass by at a relatively high speed, and where a third cell is located in the proximity of the road, etc., which third cell is not intended to serve mobile terminals in the vehicles.

Further, there are scenarios, which have a Doppler signature similar to one of Scenario Type I or II, but where it is not appropriate to use the described procedure as it may result in an unwanted change of the mobility parameters. Examples of such inappropriate scenarios are when a mobile terminal is located in a car which is moving in a turning highway, or moving along a tortuous twisty type of road in the countryside, which is turning often, but stays within the same cell. In order to avoid applying the described procedure in such inappropriate scenarios, the network should have knowledge of in which cells it is appropriate to use the described procedure.

It should be noted that the described Doppler based procedure is not intended to be used in order to select the most appropriate target cell, but to determine if a certain characteristic Doppler signature, or change of Doppler shift is at hand. If the characteristic Doppler signature is at hand, in an appropriate situation, it signifies e.g. that the mobile terminal has entered a situation where it risks losing contact with its serving cell before it has been handed over to a target cell, and that a decision to enable fast handover to a target cell can be made. The target cell may be selected using any therefore suitable method.

One embodiment of the Doppler based procedure is illustrated by a flow diagram in FIG. 1a. In the procedure, it is determined 104a whether a mobile terminal moves in a certain predetermined way in relation to a potential target cell or not. This is accomplished by measuring 102a the Doppler shift in relation to the potential target cell and analysing said measured Doppler shift. When a certain sequence of Doppler shifts occurs, it is determined 104a that the mobile terminal has moved in the predetermined way in relation to a potential target cell, and then at least one handover related parameter is adjusted 106a, in order to enable a fast or a preferred handover.

Figure 1B:
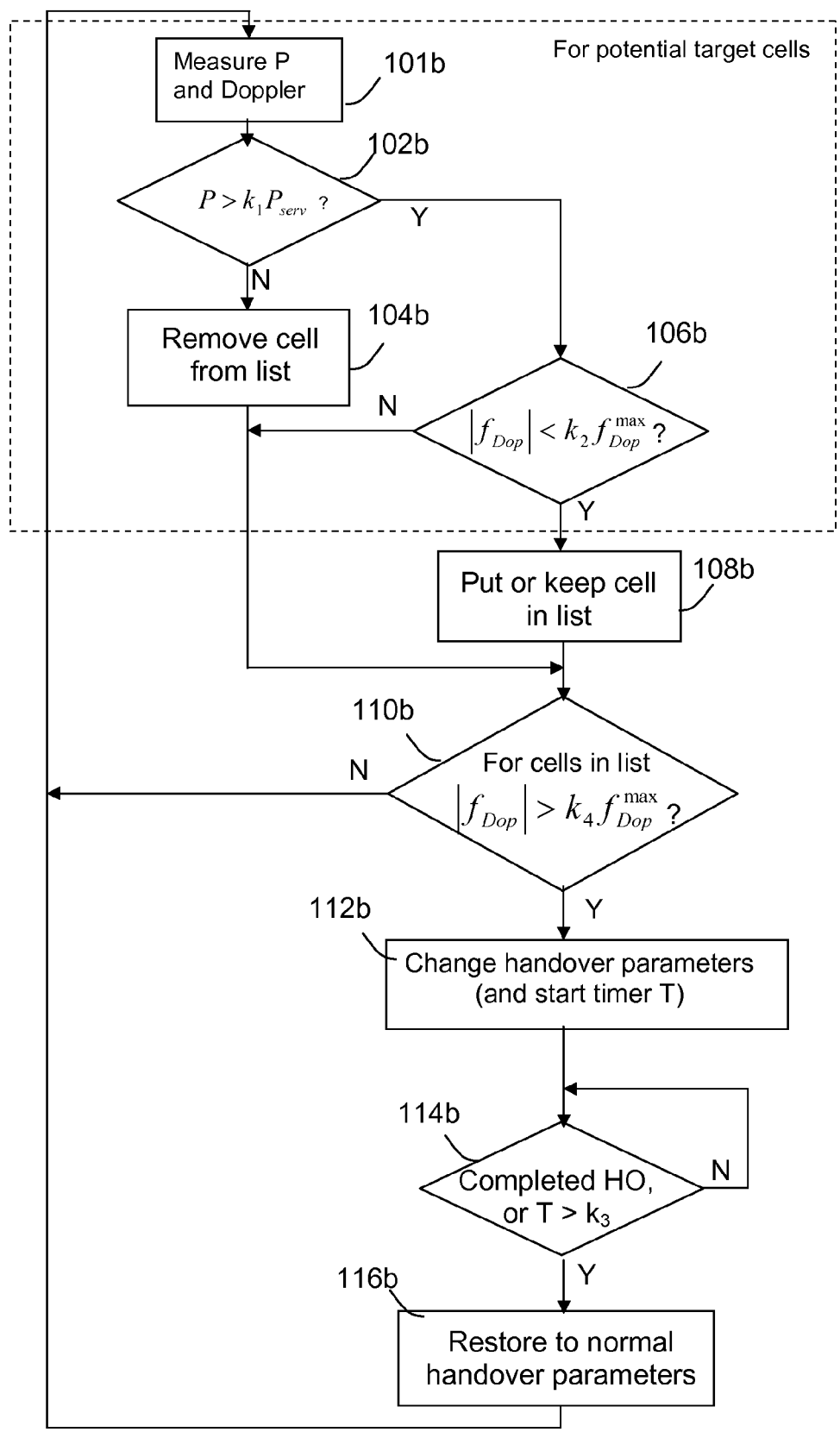

A more detailed embodiment of the Doppler based procedure is illustrated by a flow diagram in FIG. 1b. Initially, potential target cell(s) are evaluated by determining 102b if the received signal power P from the cells exceeds a certain first threshold relative to the transmit power of the serving cell $P_{serv}$, i.e. if $P > k_1 P_{serv}$. The cells for which the received power exceeds $k_1 P_{serv}$ are candidate target cells. For the candidate target cells, respectively, it is determined 106b if the absolute Doppler value $|f_{Dop}|$ is below a second threshold, possibly relative to a maximum value of the Doppler shift for that cell $f^{max}_{Dop}$, $|f_{Dop}| < k_2 f^{max}_{Dop}$. Alternatively, this comparison is only made for a selection of candidate cells. If the absolute Doppler value for a cell is found to be below the second threshold, the cell is added 108b to a list. The cell remains in the list until the received signal power from the cell drops below the first threshold. The cell could also be removed 104b from the list according to some other criteria, such as e.g. that a certain time of expiration has elapsed after the cell was added to the list.

For the cells in the list, it is iteratively determined 110b whether the absolute Doppler value of a cell exceeds a third threshold, which possibly is relative to the maximum value of the Doppler shift for that cell, i.e. if $|f_{Dop}| > k_4 f^{max}_{Dop}$. If the absolute Doppler value for any of the cells in the list exceeds the third threshold it is an indication of that a certain situation is at hand, which evinces a predetermined Doppler signature. In order to handle the detected situation, the handover settings are changed 112b, and simultaneously, a timer T may be started. After a handover has been completed or a predetermined time T>k3 has elapsed after the settings were changed, the handover settings are restored 116b to the default values. The constant k3 may be set based on e.g. conclusions drawn from collected measurement data or simulations, or be set to an estimated value.

As described in connection with FIG. 1, the thresholds to which the absolute Doppler values of the cells are compared may be set as a value depending on the maximum absolute Doppler value of the evaluated cell, which is a way to normalise the results for the different cells. One way of attaining the maximum absolute Doppler value in a cell is to be informed of this value by the network. The network could be aware of the propagation environment in the cell, e.g. a Manhattan environment, and thereby be aware of that the maximum speed in such a cell is e.g. 50 km/h, which gives a certain maximum absolute Doppler value. Alternatively, Doppler shift measurements made in a cell by a network node in the cell or mobile terminals in the cell may be collected in the cell, and from these collected measurements, the maximum absolute Doppler shift in the cell could be determined and notified to other network elements. The Doppler shift has been normalized within this document in order to enhance the readers understanding and make it easier to compare Doppler shifts in relation to different cells. However, it is also possible to use the described procedure using absolute Doppler values.

Figure 2A:
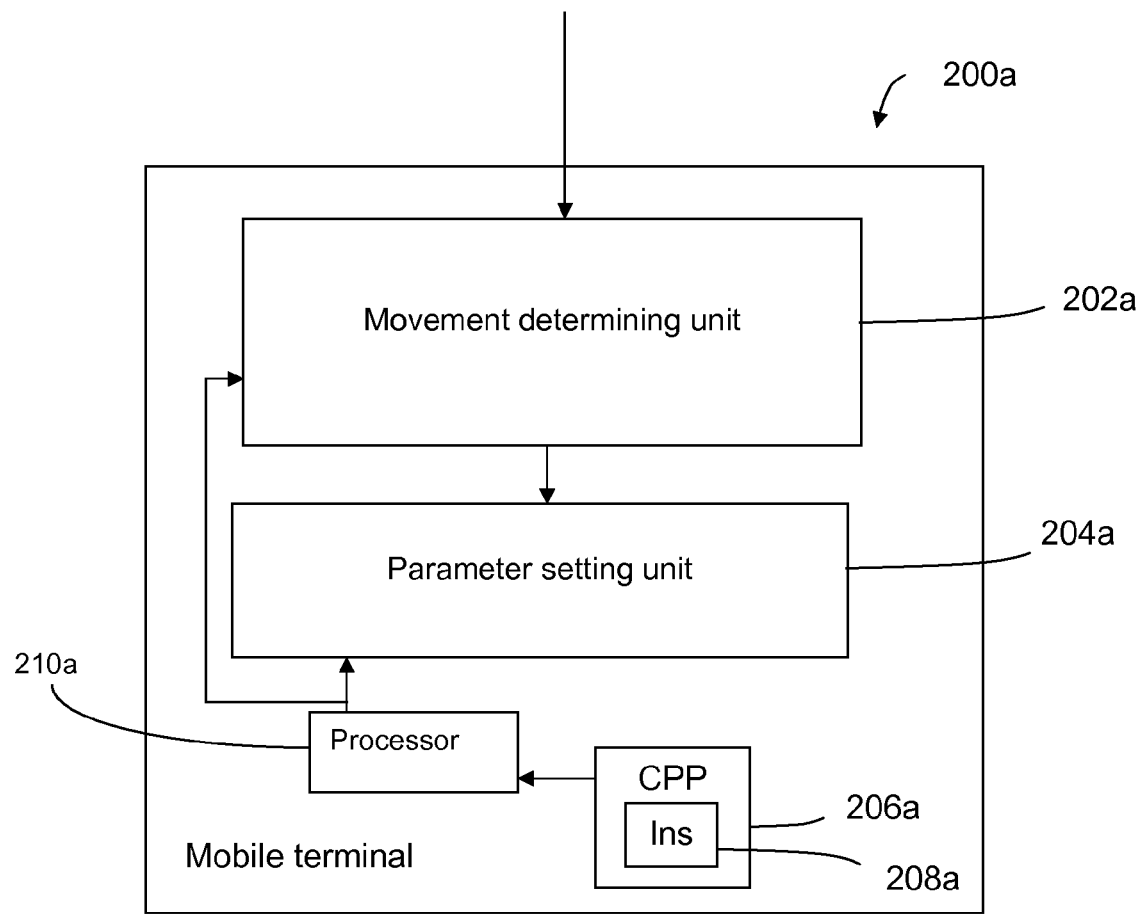
FIGS. 2a and 2b are block diagrams illustrating embodiments of an arrangement in a mobile terminal.
Figure 2B:
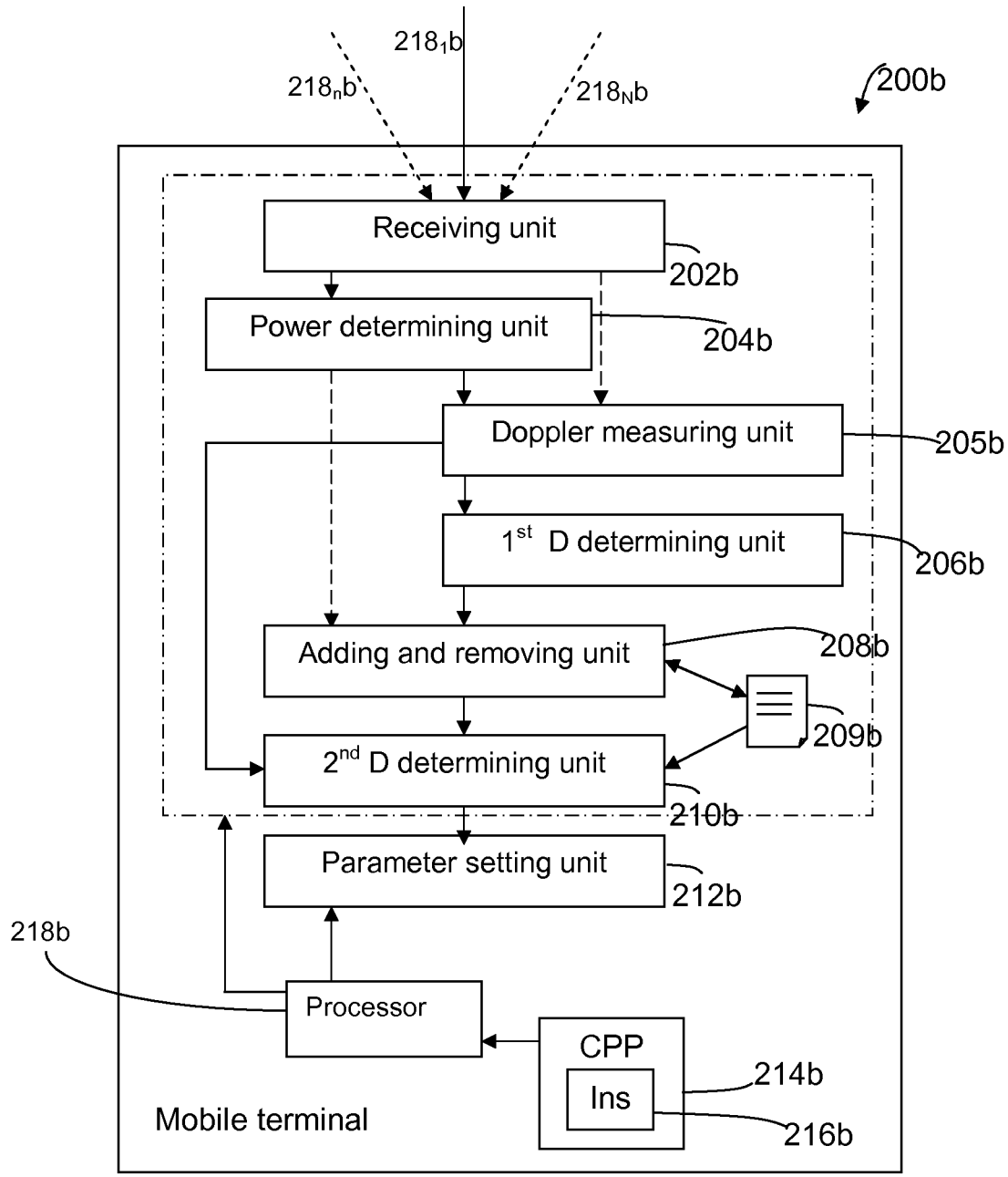

Below, an example arrangement adapted to enable the performance of the above described procedure in a mobile terminal will be described. FIG. 2a, which is a block diagram, illustrates an arrangement in a mobile terminal according to one embodiment of the invention. The example arrangement comprises a Movement determining unit 202a, which is adapted to determine whether the mobile terminal moves in a certain predetermined way in relation to a potential target cell. The determination is based on measurements of the Doppler shift in relation to a potential target cell. A Parameter setting unit 204a, is adapted to adjust one or more handover related parameters when it is determined that the mobile terminal has moved in the predefined way in relation to at least one potential target cell. The parameter(s) are adjusted in order to enable a desired handover A more detailed example embodiment of an arrangement adapted to enable the performance of the above described procedure will now be described. FIG. 2b, which is a block diagram, illustrates an arrangement in a mobile terminal according to one embodiment of the invention. Signals $218_{1-N}b$ from potential target cells are received by a receiving unit 202b. The received signals are then analysed by a power determining unit 204b, where it is determined whether the received signal power from the potential target cells, respectively, exceeds a predetermined first threshold. If the received signal power from a cell exceeds the threshold, the Doppler shift relative that cell, which is measured by a Doppler measuring unit 205b, is analysed by a $1^{st}$. Doppler determining unit 206b, where it is determined if the absolute Doppler value for the cell is e.g. below a predetermined second threshold. Alternatively, the measurement in the Doppler measuring unit and the analysis in the $1^{st}$. Doppler determining unit is performed in parallel with the evaluation of received signal power. This alternative solution is illustrated as dashed arrows in FIG. 2b. The Doppler measuring unit could alternatively be integrated in the Receiving unit. If it is determined in the power determining unit 204b that the received power from a cell is above the first threshold and it is determined in the $1^{st}$.

Doppler determining unit 206b that the absolute Doppler value for the same cell is below the second threshold, this cell is added to a list 209b by an Adding unit 208b. The Adding unit may also, at the same time, be a Removing unit, which removes cells from the list 209b if they no longer fulfil e.g. the received power criterion. Further, in a $2^{nd}$ Doppler determining unit 210b, having knowledge of the content of the list 209b, it is determined if e.g. the absolute Doppler value of any of the cells in the list exceeds a predetermined third threshold. When one of the absolute Doppler values exceeds the third threshold, the handover related mobility parameters of the mobile terminal are changed by the parameter setting unit 212b. The parameter setting unit may also start a timer T when the parameters are changed, and restore the parameters to default values when a handover has been completed or a predetermined time T>k3 has elapsed after the parameters were changed.

In FIGS. 2a and 2b is also illustrated a computer program product 206a, 214b which comprises instructions 208a, 216b, which when executed by a processor 210a, 218b or similar, will cause the units 202a-204a and 202b-212b, respectively, to perform their tasks according to an embodiment of the described procedure.

Figure 3:
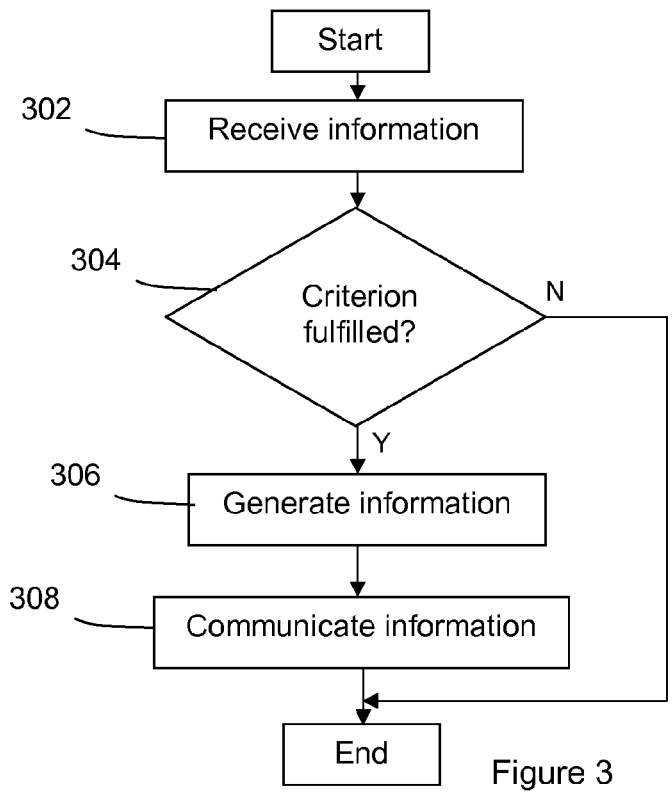
FIG. 3 is a flowchart illustrating another embodiment of method steps.

As stated earlier, there are situations where the use of the Doppler based procedure would result in unwanted change of handover parameters and thereby unwanted e.g. ping-pong effects. It is therefore desirable to be able to determine whether the procedure should be applied or not in a cell. Such a decision could be made in a network node in a cell or at a higher hierarchical level. Below, some parts of the described procedure according to an embodiment, which are performed outside the mobile terminal, will be described. FIG. 3 shows a flow diagram of the procedure in a network node according to one embodiment. The network node is assumed to have received information regarding a certain cell at some point, e.g. by collecting the information through monitoring traffic and drawing conclusions, and/or by receiving the information from another node, e.g. on a higher hierarchical level. The information could relate to e.g. if the cell comprises certain characteristic elements, such as a Scenario Type I or Type II. Then, it is evaluated 304 in the network node if it the described Doppler based procedure should be used in the cell. If it is found that it should be used, information related to handover in that cell is generated 306 and communicated 308 to mobile terminals in the cell. The information could comprise e.g. aggressive mobility parameters to be used in case it is decided in the mobile terminal that a situation calls for a fast handover, and/or threshold values, etc. The information could further or alternatively comprise an indication of the presence of a certain scenario type in the cell, for example a Scenario Type I or Type II, or any other indication of if the described procedure is supported in the cell. The network node could be the eNB in the cell in question, or another node in the network connected to one or more cells, such as e.g. an RNC, or a relay node. The handover related information could also be generated when a mobile terminal enters the cell in question.

Figure 4:
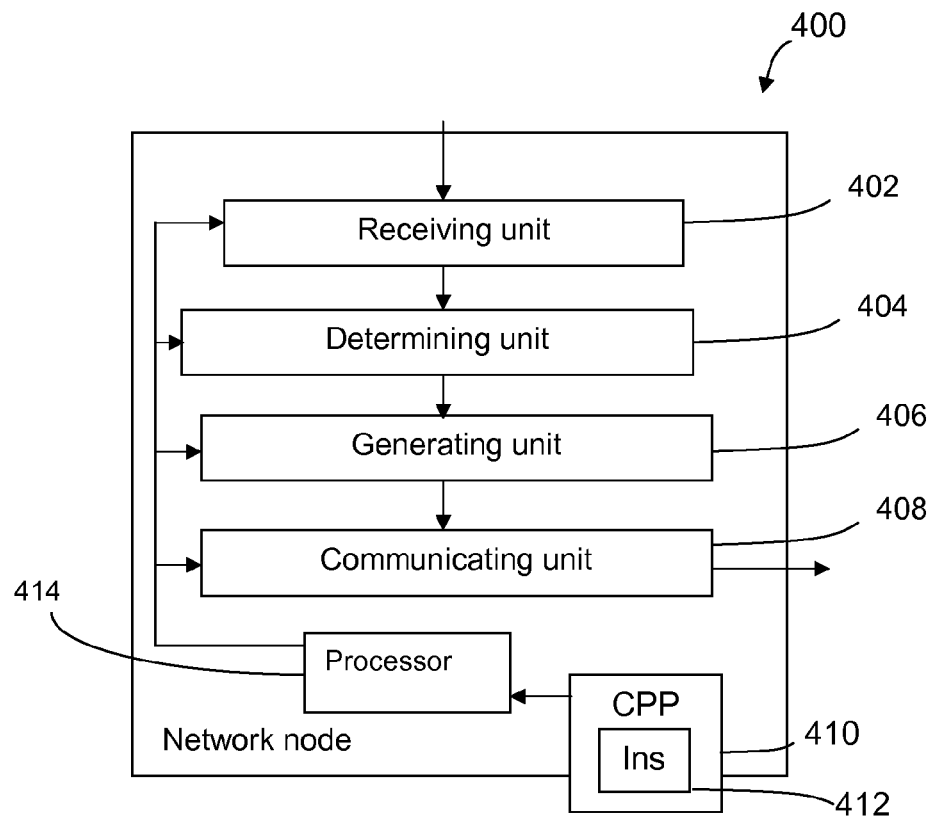
FIG. 4 is a block diagram illustrating an embodiment of an arrangement in a network node.

Below, an example arrangement adapted to enable performance of embodiments of the described procedure in a network node will be described. FIG. 4, which is a block diagram, illustrates an arrangement in a network node according to one embodiment of the invention. Information is received from e.g. the cell in question or from a network element on a higher hierarchical level, regarding a certain cell at some point by a receiving unit 402. Based on the received information, it is determined in a determining unit 404 if the described Doppler based procedure should be used in the cell in question. If it is determined that the Doppler based procedure should be used, information related to handover in that cell is generated in a generating unit 406. The generated information is then communicated to mobile terminals in the cell in question by a communicating unit 408. In FIG. 4 is also illustrated a computer program product 410, which comprises instructions 412, which when executed by a processor 414 or similar, will cause the units 402-408 to perform tasks according to an embodiment of the described procedure. The generation of handover related information may also include retrieving previously stored values from a memory, or the like.

It should be noted that FIGS. 2a, 2b and 4 merely illustrate various functional units in the mobile terminals 200a and 200b and the network node 400 in a logical sense. However, the skilled person is free to implement these functions in practice using any suitable software and/or hardware means. Thus, the invention is generally not limited to the shown structure of the mobile terminals 200*a* and 200*b* or network node 400. The procedure steps illustrated in FIGS. 1*a*, 1*b*, 3, 5*a*, 5*b*, 12 and 13 are also illustrated in a logical sense.

Figure 5A:
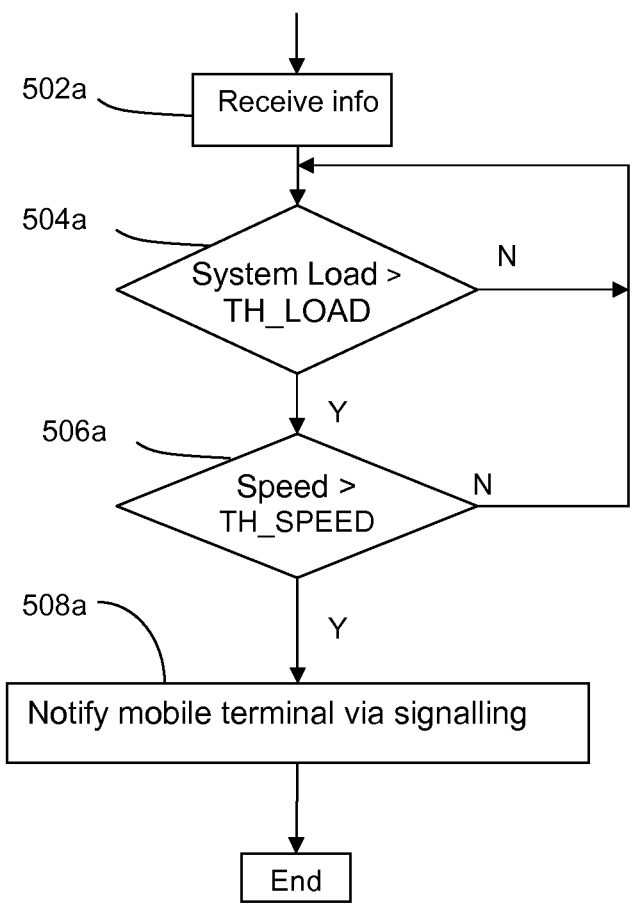
FIGS. 5a and 5b are flowcharts illustrating embodiment of method steps.

As described earlier, it is mainly mobile terminals moving faster than a certain speed, which experience handover failure due to the corner effect. Further, it is mainly when the system traffic load is relatively high that the handover failures occur. Therefore, it would be beneficial to be able to apply the described Doppler based procedure only when the mobile terminal speed and the system load exceed a certain level, which could be addressed by the following: FIG. 5*a*, which is a flow diagram, illustrates some procedure steps in a network node according to one embodiment of the invention. In this embodiment, it is evaluated if a system load exceeds a predetermined threshold TH_LOAD. If the system load exceeds TH_LOAD, it is evaluated if the speed of a mobile terminal exceeds the predetermined threshold TH_SPEED. If the speed of the mobile terminal exceeds TH_SPEED, the mobile terminal in question is notified e.g. via explicit signalling, concerning information, which the mobile terminal may need when entering a certain handover related situation. The thresholds could be selected based e.g. on collected measurements or be set to some estimated values.

Alternatively, the evaluation of if the system load and/or mobile terminal velocity exceeds certain thresholds could be performed in the mobile terminal, which then would need to acquire knowledge of the system load and the mobile terminal velocity, e.g. through signalling from another network element and/or by performing measurements. Typically, a mobile terminal can determine its own velocity, but not determine the system load. When the evaluation or a part of the evaluation takes place in the mobile terminal, the evaluation could be preceded by the reception of an indication of that the serving cell supports the described Doppler based procedure.

Figure 5B:
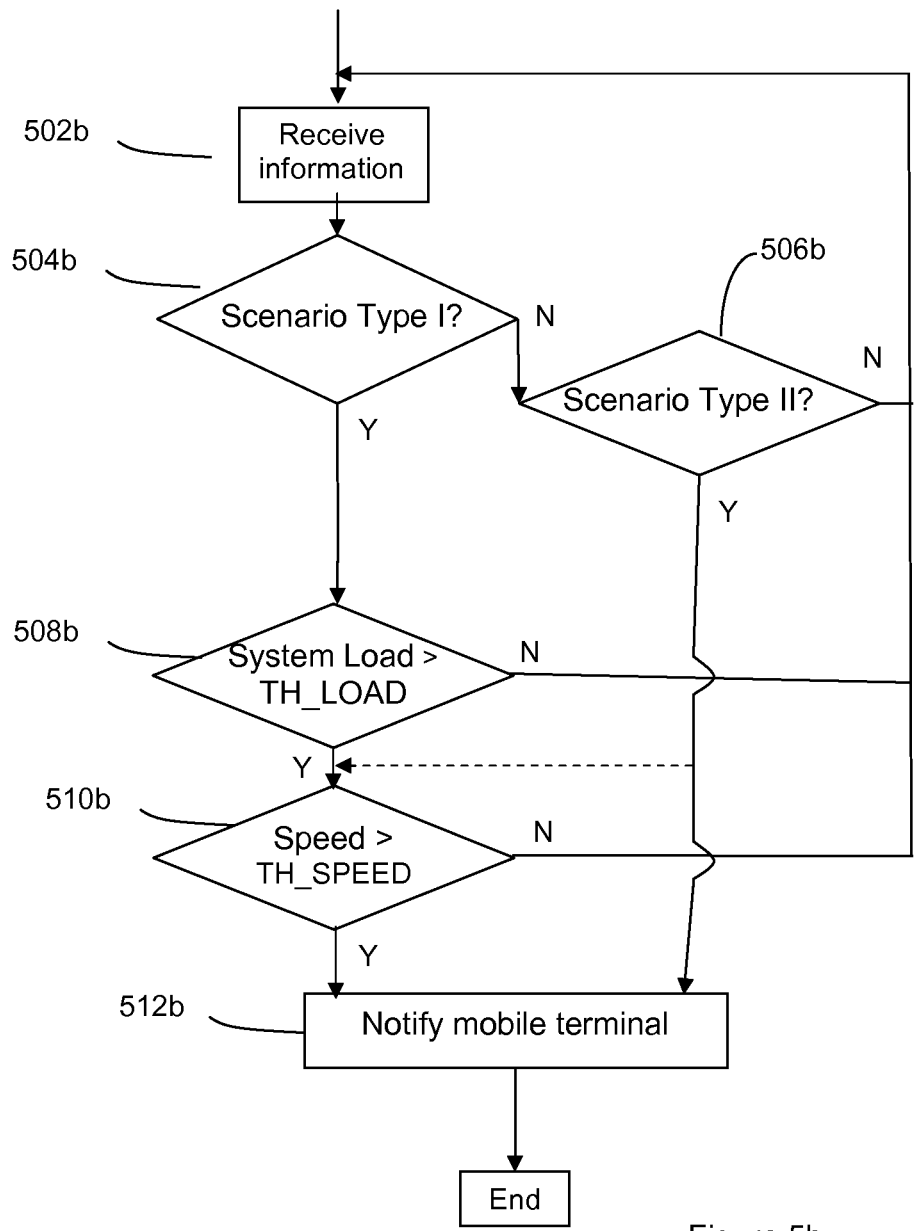

FIG. 5*b*, which is a flow diagram, illustrates some procedure steps according to one embodiment of the invention. In this embodiment, it is evaluated in a network node if the criteria 504*b* or 506*b*, 508*b* and 510*b* for applying the described Doppler based procedure are fulfilled for a certain mobile terminal. If the criteria are fulfilled, and the Doppler based procedure should be applied in a mobile terminal, the mobile terminal is notified 512*b* through e.g. explicit signalling. In another embodiment, the evaluation of the criteria 504*b*-508*b* concerning scenario and system load are performed in a network node, and if these criteria are fulfilled, information related to the described Doppler based procedure are broadcasted 512*b* in the evaluated cell, and the evaluation of the mobile terminal speed criteria 512*b* is performed by mobile terminals in said cell.

Figure 6:
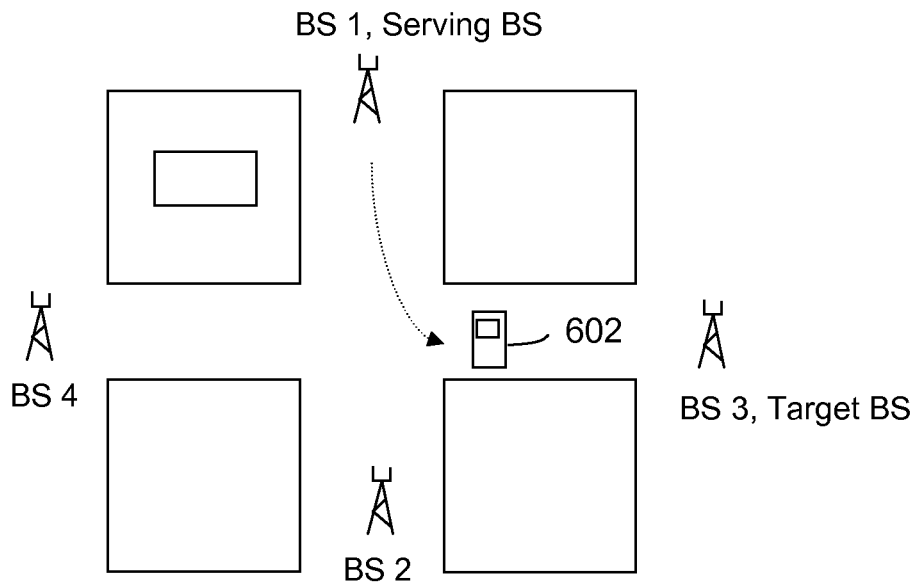
FIGS. 6 and 7 illustrate two different situations in an intersection in a Manhattan-type scenario.
Figure 7:
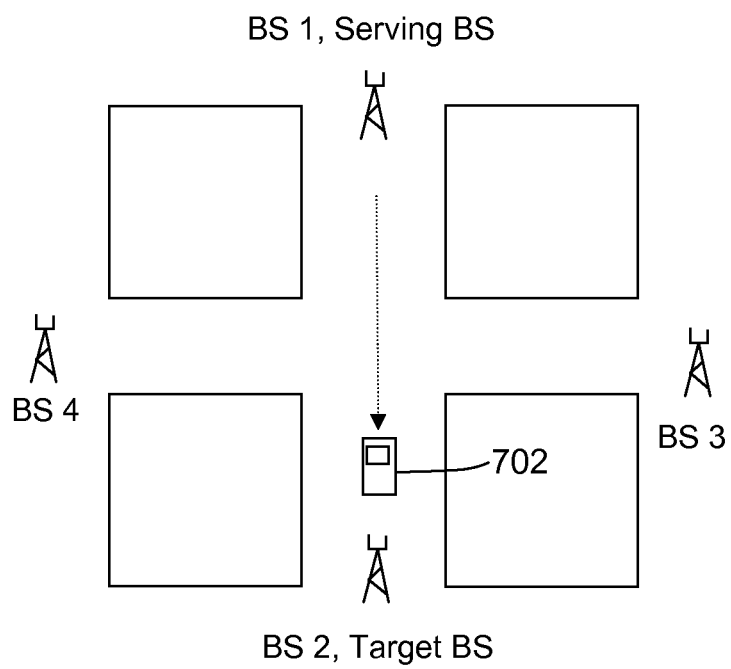

The described Doppler based procedure will now be illustrated by two example situations in a Scenario Type I shown in FIG. 6 and FIG. 7. In the examples it is assumed that the speed of the mobile terminal is somewhat decreased in the intersection.

Figure 9:
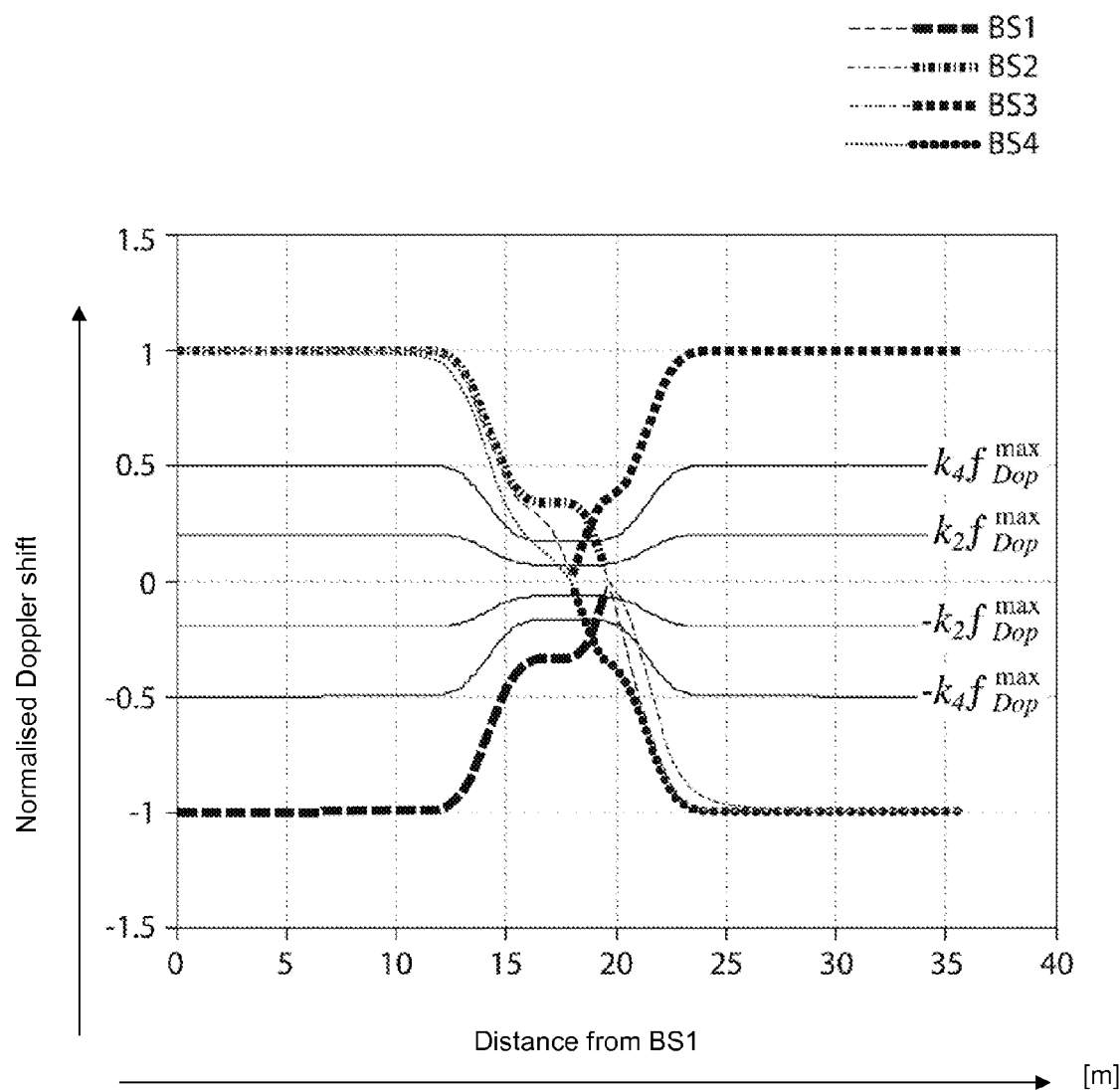
FIGS. 9 and 10 illustrate the Doppler signatures for the situations illustrated in FIGS. 6 and 7 according to one embodiment.

FIG. 6 illustrates an intersection in a Manhattan-like scenario, and shows a mobile terminal 602, which is served by a base station, BS1. The mobile terminal is located e.g. in a car or on a bike, and moves at a certain speed away from BS1. When approaching the intersection, three potential target base stations are available to the mobile terminal i.e. BS2, BS3 and BS4, one in each street canyon emerging from the intersection. In the intersection, the mobile terminal slows down and turns left towards BS3. The turn is made in a relatively smooth way. The Doppler signature of this scenario is illustrated in FIG. 9, which will be described in more detail below. Using an embodiment of the described Doppler based procedure, it can be determined from the Doppler signature that the mobile terminal is in a situation where it, when using conventional handover settings, may lose contact with its serving base station before it is handed over to a target base station. In this example, the target base station is BS3. A decision to change the handover settings in order to enable a fast handover can thereby be made based on the Doppler signature.

Figure 10:
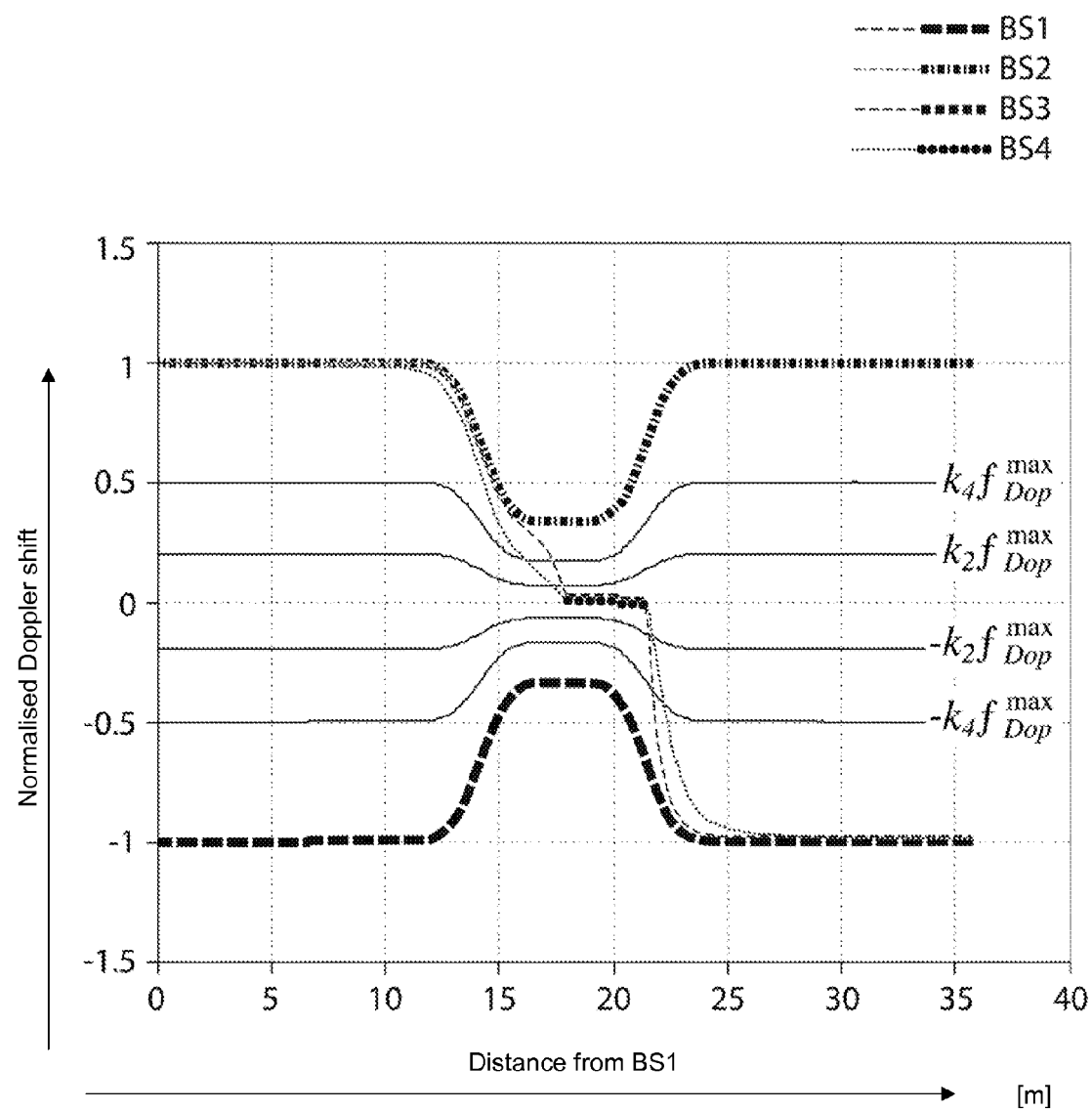

FIG. 7 illustrates an intersection in a Manhattan-type scenario, similar to the one illustrated in FIG. 6. In this situation, however, the mobile terminal 702 does not turn in the intersection, but continues straight ahead towards BS2. The Doppler signature of this scenario is illustrated in FIG. 10, which will be described in more detail below. Using an embodiment of the described Doppler based procedure, it can be determined from the Doppler signature that the mobile terminal is not in a situation where it, when using conventional handover settings, will lose contact with its serving base station before it is handed over to a target base station, which in this example is BS2. Thus, the handover settings will not be changed to more aggressive values in this example.

There are situations with other handover related problems than in the example described in connection with FIG. 6. The described Doppler based procedure will now be further illustrated by an example situation in a Type II scenario, shown in FIG. 8.

Figure 8:
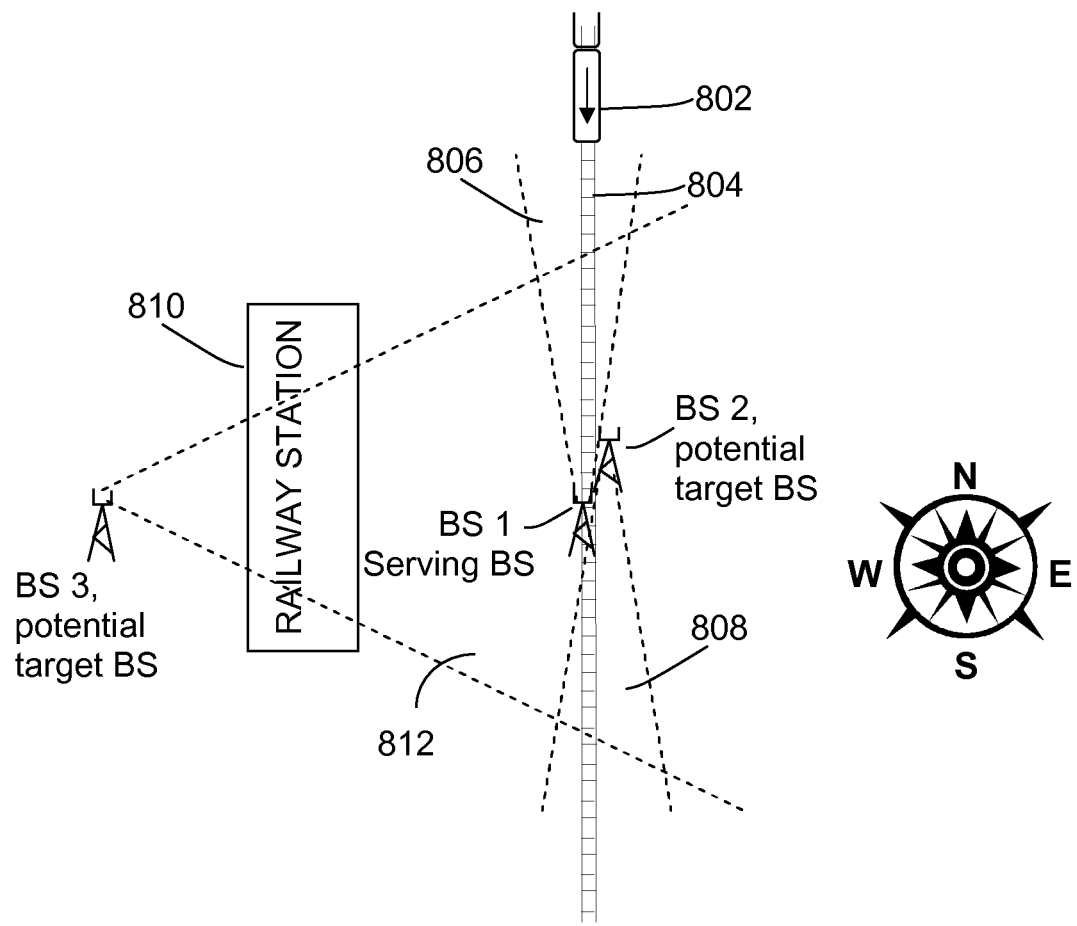
FIG. 8 illustrates a Scenario Type II along a railway.

FIG. 8 illustrates two relatively co-located base stations, BS1 and BS2, each controlling a relatively narrow cell 806, 808, directed along a railway track 804, where the cells are directed in approximately opposite directions. BS1 may for example be directed to the north, and BS2 directed substantially to the south. The base stations are located close to a railway station 810, where another base station, BS3, is located, as illustrated in FIG. 8. A mobile terminal served by BS1 is situated on a high speed train 802, which approaches the railway station 810 at a certain speed. Here, aggressive mobility parameters are used by mobile terminals located in the high speed train, in order to handle e.g. a handover from BS1 to BS2 at full speed. If the train stops at the railway station, the mobile terminal could be handed over to either BS2 or BS3. The operator's wish is though, that a mobile terminal, which leaves the train at the station, is handed over to BS3, and that a mobile terminal which stays in the train is handed over to BS2. The reason for this being that the cell 808, generated by BS2, is mainly targeted to mobile terminals travelling in the train. In a situation where a mobile terminal, which leaves the train and moves e.g. to the train station, is attached to BS2, it will sooner or later be handed over to BS3. An operator's wish is to minimize the number of generated handovers. Hence, the operator's wish is to facilitate a handover to BS3 of mobile terminals which leave the train at the station. In other words, an operator would like to obstruct or prevent a handover to BS2 of a mobile terminal which leaves the train at the station, which may be done by changing the mobility parameters of the mobile terminal to conservative settings. By applying an embodiment of the invention, it could be determined, based on the changes in Doppler shift seen from the mobile terminal relative BS1-BS3, that the mobile terminal has deviated from the tracks, i.e. turned. Hence, when a deviation from the tracks is detected, conservative handover settings are used, which are appropriate for slowly moving UEs.

If, however, the train passes the station at a relatively high speed, i.e. without stopping at the train station, the mobile terminal is in a situation where it, if using conventional handover settings, may be handed over to BS3 when the train is in front of the train station, and shortly thereafter, the mobile terminal would be handed over to BS2. This is not a desired system behaviour from an operators point of view. Therefore, applying an embodiment of the invention in this situation would result in that it could be determined, based on the changes in Doppler shift seen from the mobile terminal relative BS1-BS3, that the mobile terminal has not stopped or deviated from the tracks, and thereby that the handover settings should not be changed, since it is desired to enable a fast handover to BS2. The unnecessary handover to BS3 could thereby be avoided, because originally the BS3 did not satisfy the condition $|f_{Dop}|>k_4 f^{max}_{Dop}$ in FIG. 12.

Some examples of Doppler signatures will now be described for further understanding of the invention. By Doppler signature is throughout this document meant the changes in Doppler shift relative one or more base station(s), seen from a mobile terminal during a certain course of events, e.g. when a mobile terminal turns a corner in a Manhattan-like scenario.

FIG. 9 illustrates the value of the Doppler shift seen from the mobile terminal 602 relative BS1-BS4 when moving through an intersection as illustrated in FIG. 6. Bold lines illustrates line of sight to a BS. The Doppler value is proportional to the speed of the mobile terminal. At first, the Doppler value relative BS2-BS4 is high. Due to corner diffraction, it appears to the mobile terminal as if it approaches BS2-BS4 equally fast. At a point approximately 6 meters from the intersection (x≈12 m), the mobile terminal starts to slow down, which can be seen as a decrease in the absolute Doppler values. When the mobile terminal enters the intersection (x≈18), it has line of sight to all base stations, which can be seen in that all Doppler values are illustrated in bold lines. When entering the intersection, the mobile terminal moves approximately perpendicular to BS3 and BS4, and therefore the Doppler values relative these base station approaches zero and then fulfils $|f_{Dop}|<k_2 f^{max}_{Dop}$. Base stations 3 and 4 are in LOS from the mobile terminal in the intersection, which entails that BS3 and BS4 fulfil the power criterion $P>k_1 P_{serv}$. Here it is assumed that a base station fulfils the power criterion when it is in LOS from the mobile terminal. Thus, BS3 and BS4 are added to a list 209b of base stations to be further evaluated, when applying an embodiment of the invention. When the mobile terminal turns and moves towards BS3, the Doppler value relative BS3 increases and the Doppler value relative BS4 decreases, whereby the criterion $|f_{Dop}|>k_4 f^{max}_{Dop}$ is fulfilled for both BS3 and BS4. This fulfilment of $|f_{Dop}|>k_4 f^{max}_{Dop}$ for, in this case, two base stations on the list, indicates that a certain situation is at hand and triggers the mobile terminal to change the handover settings.

Further, when the mobile terminal turns and moves towards BS3, still having LOS to all BS, it moves approximately perpendicular to BS1 and BS2, and consequently, the Doppler values relative these base station approaches zero and thereby fulfils $|f_{Dop}|<k_2 f^{max}_{Dop}$. As BS1 and BS2 are in LOS from the mobile terminal in the intersection, they also fulfil the power criterion $P>k_1 P_{serv}$, and are therefore added to the list 209b of base stations, which are to be further evaluated. However, a moment or a short distance later, when the mobile terminal has left the intersection, BS1 and BS2 are no longer in LOS from the mobile terminal, and consequently, BS1 and BS2 will then be removed from the list of base stations, which are to be further evaluated.

FIG. 10 illustrates the value of the Doppler shift seen from the mobile terminal 702 relative BS1-BS44 when moving through an intersection as illustrated in FIG. 7. Until the mobile terminal enters the intersection (x≈18), the Doppler values are similar to the ones in FIG. 9. Here, the mobile terminal moves approximately perpendicular to BS3 and BS4 through the whole intersection, which entails that the criteria $|f_{Dop}|<k_2 f^{max}_{Dop}$ and $P>k_1 P_{serv}$ are fulfilled for BS3 and BS4. Thus, BS3 and BS4 are added to a list 209b of base stations to be further evaluated, when applying an embodiment of the invention. In this scenario, however, BS3 and BS4 will lose LOS to the mobile terminal when it leaves the intersection (x=22). Thus, BS3 and BS4 will be removed from the list 209b before they fulfil the criterion $|f_{Dop}|>k_4 f^{max}_{Dop}$. BS1 and BS2 will not be added to the list since the Doppler value relative these base stations do not fulfil $|f_{Dop}|<k_2 f^{max}_{Dop}$. Thus, the Doppler signature of the scenario illustrated in FIG. 7 does not indicate that a certain scenario is at hand, and the mobile terminal will therefore not be triggered to change the handover settings.

If preferred, the measured values could be forwarded from the mobile terminal to another node, which then could perform the evaluation of the values and communicate the result to the mobile terminal or order a change of handover parameters. This would, however, be slower and generate more traffic in the network.

Figure 11:
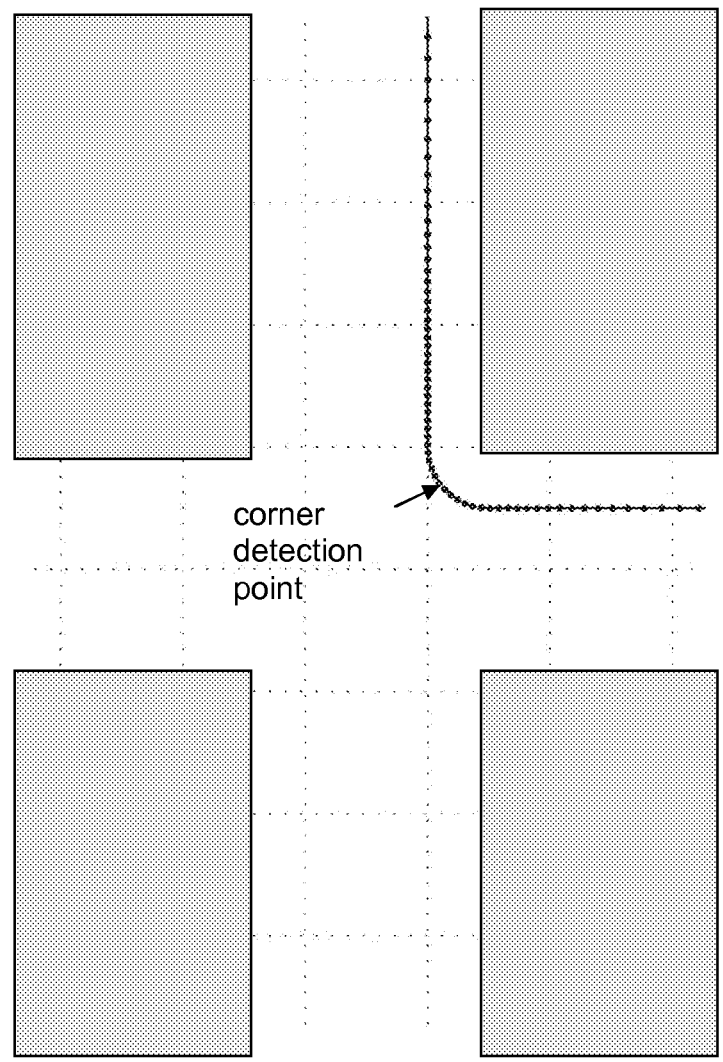
FIG. 11 illustrates the point where it can be determined that a mobile terminal has entered a certain situation according to one embodiment.

FIG. 11 illustrates the approximate point in an intersection where it can be determined whether a mobile terminal according to one embodiment, of which the movement is illustrated as a dotted line, is about to turn around a corner, or not, according to one embodiment. The mobile terminal moves in the same direction as the mobile terminal in FIG. 6, i.e. from the "north" to the "east".

Figure 12:
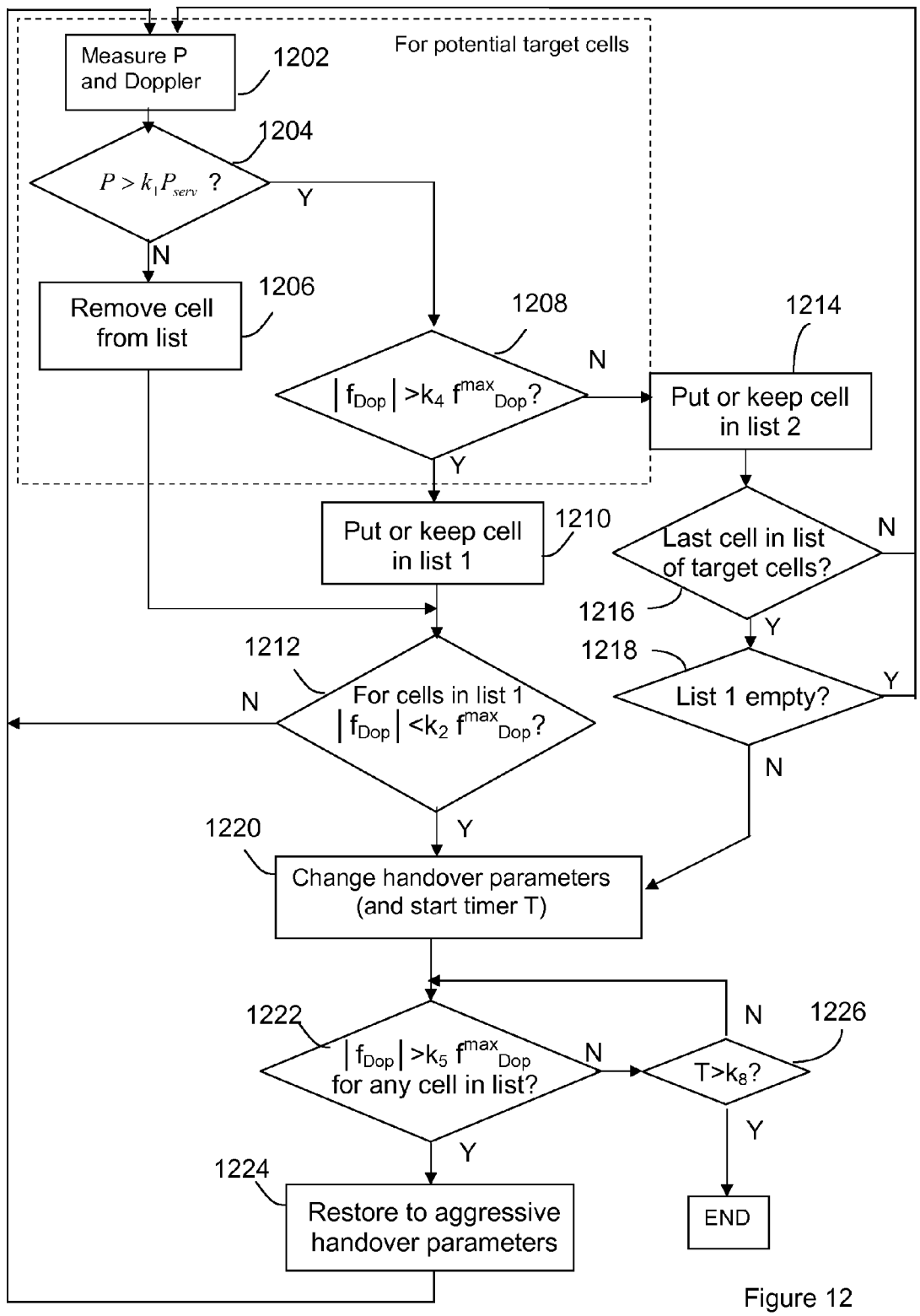
FIGS. 12 and 13 are flow charts illustrating method steps in e.g. a Scenario Type II, according to one embodiment.

FIG. 12, which is a flowchart, illustrates a Doppler based procedure in a Scenario Type II according to one embodiment, where the mobility parameters are already set to aggressive values when entering the flow chart. The flow chart steps 1202-1212 are similar to the ones in FIG. 1b, except that the criteria in 1208 and 1212 are different, since it is a different scenario. It should also here be noted that the threshold values of 1208 and 1212 does not necessarily need to be normalized using maximum Doppler values. In FIG. 12, there is also a second branch in the flow chart, i.e. 1214-1218, which identifies or sorts out base stations located near the track or road, but which are not intended to serve mobile terminals in vehicles moving along a track or road. The handover parameters of the mobile terminal are changed 1220 if the absolute value of the Doppler shift in relation to the potential target cells in list 1 is below a predetermined threshold. The handover parameters are restored 1224 to aggressive values if the mobile terminal starts to move fast 1222 in relation to the potential target cells. If the mobile terminal deviates from the track (not shown) or a certain time T4 has elapsed after the handover parameters were changed, the handover parameters will not be restored to the original values. The deviation from the track could be determined by analyzing the Doppler shift in relation to the potential target cells, especially in relation to the potential target cells in list 2.

Figure 13:
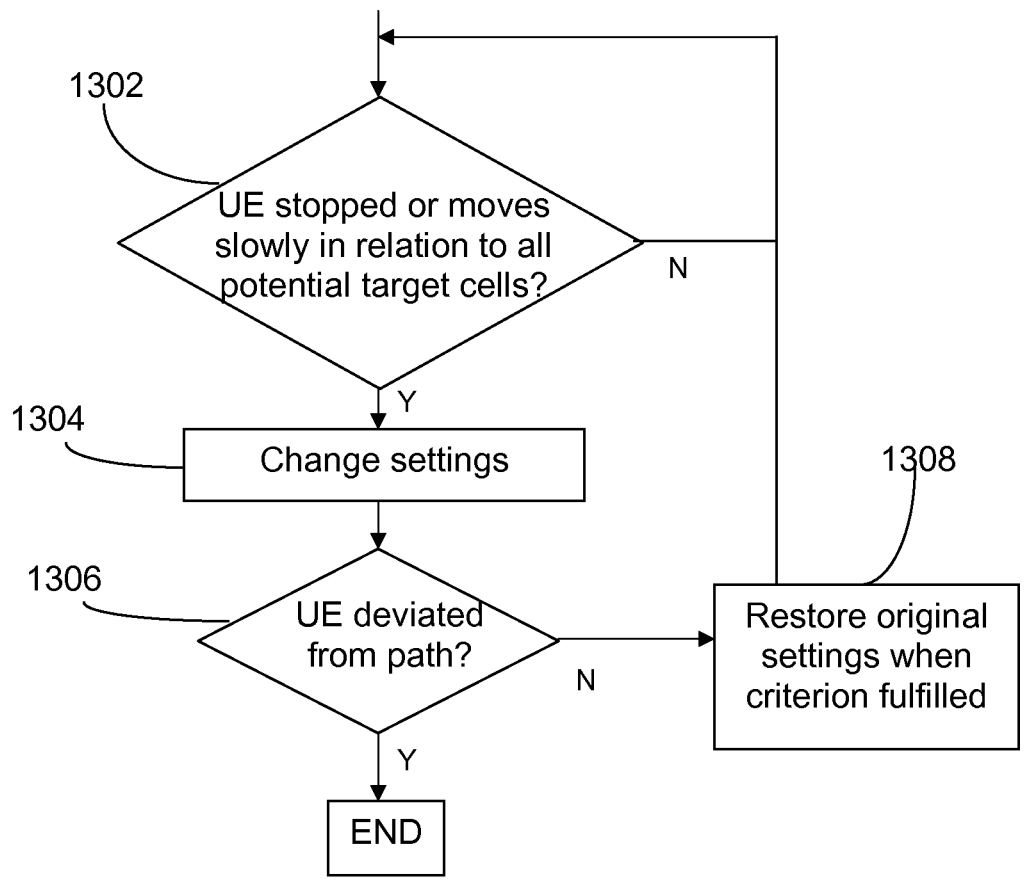

FIG. 13 which is a flowchart, illustrates a Doppler based procedure according to one embodiment in a Scenario Type II, where the mobility parameters are already set to aggressive values when entering the flow chart. Based on the Doppler shift from a mobile terminal in relation to the potential target cells for the mobile terminal, it is determined 1302 if the mobile terminal has stopped or if it moves slowly. If it is determined 1302 that the mobile terminal moves slowly, i.e. slower than a predetermined threshold, the mobility parameters are changed 1304 from aggressive settings to conservative settings in order to avoid unwanted handovers. It is further determined 1306, based on the Doppler shift in relation to the potential target cells, if the mobile terminal has deviated from a certain path, e.g. a track or road along which two narrow cells, each generated by one of two relatively co-located base stations, point in relatively opposite directions. If the mobile terminal has deviated from the path, it is here assumed that it will no longer move with an as high speed as before, and therefore, the mobility parameter settings should remain to be conservative. If the mobile terminal remains in the path, the mobility parameters should be restored 1308 to their original aggressive settings when a certain criterion is fulfilled. The criterion could e.g. be that the Doppler shifts relative the potential target cells indicate that the mobile terminal moves faster than a certain speed threshold.

An advantage of the invention is that it enables to only adapt the mobility parameters when needed, e.g. when a mobile terminal is turning a corner in a Manhattan-like scenario when the communication system serving the mobile terminal is having a relatively high load. This will reduce the number of handover failures without creating considerable amounts of ping-pong handovers.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has mainly described a Manhattan-like scenario and a train scenario, the scope of the invention is not limited hereto. The invention is generally defined by the following independent claims.

The invention claimed is:

1. A method in a mobile terminal in a wireless communication system, for supporting a handover from a serving cell to a target cell, the method comprising:
   determining whether the mobile terminal has moved in a predefined way in relation to a potential target cell, based on a sequence of two or more Doppler shift measurements, wherein said determining comprises
      determining whether a received signal power from the potential target cell exceeds a first predetermined threshold according to a first criterion,
      measuring a Doppler shift related to said potential target cell,
      determining whether the absolute value of the measured Doppler shift is below a second predetermined threshold according to a second criterion,
      adding a potential target cell for which the first and second criterion are fulfilled to a list, and
      determining whether the absolute value of the measured Doppler shift related to each of the cells in the list, respectively, exceeds a third predetermined threshold, which is higher than the second threshold; and
   adjusting a handover related parameter, in order to enable a handover, in response to a determination that the mobile terminal has moved in the predefined way, wherein said adjusting comprises changing the handover related parameter in response to determining that the Doppler shift related to any of the cells in the list exceeds the third threshold.

2. The method of claim 1, wherein the adjusted parameter relates to the Time-To-Trigger (TTT) or to the Hysteresis (H).

3. The method of claim 1, wherein determining whether the mobile terminal has moved in the predefined way in relation to the potential target cell is performed when a triggering criterion is fulfilled.

4. The method of claim 3, wherein the triggering criterion is fulfilled when one or more of the following conditions a), b) and c) apply:

a. the velocity of the mobile terminal exceeds a fourth predetermined threshold,
   b. the system load exceeds a fifth predetermined threshold
   c. the terminal is in a cell comprising a street intersection in a Manhattan-like area, or two approximately co-located narrow cells pointing in opposite directions along a road, railway or waterway, where vehicles pass by.

5. The method of claim 1, wherein the mobile terminal receives handover related information via a broadcast message in the serving cell.

6. The method of claim 1, wherein the mobile terminal receives handover related information via explicit signaling.

7. The method of claim 1, wherein the adjusted handover related parameter is restored to its original value after the completion of a handover, or after a certain predetermined time has elapsed after the parameter is changed, or when the absolute value of the measured Doppler shift related to any of the potential target cells exceeds a predetermined threshold.

8. An arrangement in a mobile terminal adapted to support a handover from a serving cell to a target cell, said arrangement comprising a processing circuit configured to:
   a determine whether a mobile terminal has moved in a predefined way in relation to a potential target cell, based on a sequence of two or more Doppler shift measurements, by measuring the received signal power from a potential target cell;
      determining whether the received power from a potential target cell exceeds a first predetermined threshold, according to a first criterion;
      measuring a Doppler value related to a potential target cell;
      determining whether the absolute value of the Doppler shift related to a potential target cell is below a second predetermined threshold according to a second criterion;
      adding the potential target cells for which the first and second criterion are fulfilled to a list, and
      determining whether the absolute value of the Doppler shift related to a cell in the list exceeds a third predetermined threshold that is higher than the second threshold; and
   adjust a handover related parameter, in order to enable a handover, in response to a determination that the mobile terminal has moved in the predefined way, by changing the handover related parameter in response to determining that the Doppler shift related to any of the cells in the list exceeds the third threshold.

9. The arrangement of claim 8, wherein the parameter setting unit is further adapted to change the TTT (Time To Trigger) or the H (Hysteresis), or both.

10. The arrangement of claim 8, wherein the parameter setting unit is further adapted to change the handover related parameter to the more aggressive value TTT_Aggressive, or H_Aggressive, or both.

11. The arrangement of claim 8, wherein the arrangement further comprises a receiving unit adapted to receive information via a broadcast message in the serving cell, or via explicit signaling, or both.

12. The arrangement of claim 8, wherein the parameter setting unit is further adapted to restore the adjusted handover related parameter to its original value after the completion of a handover, or after a certain predetermined time has elapsed after the handover related parameter is changed, or when the absolute value of the measured Doppler shift related to any of the potential target cells exceeds a predetermined threshold.

13. A method in a mobile terminal in a wireless communication system, for enabling a handover related decision from a serving cell to a target cell, the method comprising:

determining whether a received signal power from a potential target cell exceeds a first predetermined threshold according to a first criterion;

measuring a Doppler shift related to said potential target cell;

determining whether an absolute value of the measured Doppler shift is below a second predetermined threshold, according to a second criterion;

adding the potential target cell for which the first and second criterion are fulfilled, to a list;

determining whether the absolute value of the measured Doppler shift related to each of the cells in the list, respectively, exceeds a third predetermined threshold, which is higher than the second threshold; and changing a parameter related to said handover related decision in response to determining that the Doppler shift related to any of the cells in the list exceeds the third threshold.

\* \* \* \* \*